United States Patent [19]

Saito et al.

[11] Patent Number: 4,901,174
[45] Date of Patent: Feb. 13, 1990

[54] DISK CASSETTE LOADING AND EJECTING MECHANISM FOR A MAGNETIC DISK APPARATUS

[75] Inventors: Yukio Saito; Masao Ohkita, both of Furukawa, Japan

[73] Assignee: Alps Electric Co., Ltd., Tokyo, Japan

[21] Appl. No.: 180,296

[22] Filed: Apr. 12, 1988

[30] Foreign Application Priority Data

Dec. 16, 1987 [JP] Japan .................. 62-316093

[51] Int. Cl.$^4$ ............................ G11B 17/028
[52] U.S. Cl. .................. 360/99.06; G11B 17/028
[58] Field of Search ............ 360/99.02, 99.06, 99.03, 360/99.07

[56] References Cited

U.S. PATENT DOCUMENTS

| | | | |
|---|---|---|---|
| 4,573,093 | 2/1986 | Obama et al. | 360/97 |
| 4,604,666 | 8/1986 | Kitahara et al. | 360/99.06 |
| 4,679,106 | 7/1987 | Okita et al. | 360/99.06 |
| 4,685,010 | 8/1987 | Tronzano | 360/99.06 |
| 4,707,819 | 11/1987 | Ehara | 360/99.06 |
| 4,737,871 | 4/1988 | Saito | 360/99.02 |

Primary Examiner—Robert S. Tupper
Attorney, Agent, or Firm—Guy W. Shoup; Brian D. Ogonowsky

[57] ABSTRACT

A disk cassette loading mechanism for a disk driving apparatus, capable of preventing the accidental removal of a disk cassette from the disk driving apparatus. The disk cassette loading mechanism comprises a first operating member which engages a disk cassette inserted in the disk driving apparatus upon the arrival of the disk cassette at a predetermined position and remains engaging the disk cassette until the disk cassette becomes ready to be ejected, a second operating member which is turned resiliently in a cassette loading direction after the first operating member has engaged the disk cassette to load the disk cassette, and a third operating member which comes into engagement with the first operating means to turn the first operating member so that the first operating member is disengaged from the disk cassette when the disk cassette is moved to an ejecting position where the disk cassette is ready to be ejected without interfering with any mechanism of the disk driving apparatus by operating the sliding plate of the disk driving apparatus for cassette ejecting operation. Thus, the disk cassette loading mechanism prevents the accidental removal of the disk cassette from the disk driving apparatus.

3 Claims, 8 Drawing Sheets

DISK CASSETTE LOADING AND EJECTING MECHANISM FOR A MAGNETIC DISK APPARATUS

BACKGROUND OF THE INVENTION

1. Field of the Invention

The present invention relates to a disk cassette loading mechanism for employment in a disk driving apparatus, such as a magnetic disk apparatus, which receives a disk cassette holding an information recording disk (hereinafter referred to simply as "disk") therein for recording information in the disk or reproducing information stored in the disk.

2. Description of the Prior Art

It has been a general practice to push a disk cassette by hand into a disk driving apparatus to place the disk cassette on a cassette holder retained at a cassette unloading position by a locking mechanism in loading the disk on a disk driving apparatus. In such a conventional disk driving apparatus of a manual loading system, the locking mechanism retaining the cassette holder at the disk unloading position apart from a rotative driving mechanism is disengaged upon the arrival of the disk cassette at a predetermined position on the cassette holder to allow the cassette holder to be moved to a cassette loading position, then the disk held in the disk cassette is loaded on the rotative driving mechanism and, at the same time, a recording/reproducing head (hereinafter referred to as "magnetic head") is brought into contact with the surface of the disk to record information in the disk or to reproduce information stored in the disk. In unloading the disk cassette from the conventional disk driving apparatus, it sometimes occurs that the disk cassette is ejected before the cassette holder is shifted exactly from the disk loading position to the disk unloading position after the magnetic head has been separated from the disk. In such a case, it is possible that the magnetic head remains at the operative position after the disk has been removed from the disk driving mechanism and strikes accidentally against the adjacent parts to break itself entailing damages in the internal mechanisms.

To obviate such troubles, various disk driving apparatus of an automatic loading system have been proposed. Japanese Utility Model Provisional Publication No. 61-149162 of the applicant of this patent application discloses such a disk driving apparatus of an automatic loading system.

Figure 7:
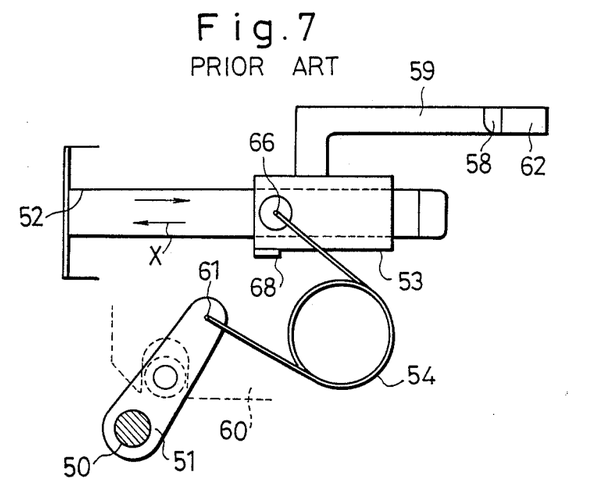
FIG. 7 is a schematic plan view showing a torsion coil spring and the associated parts of a conventional automatic disk cassette loading mechanism.
Figure 8:
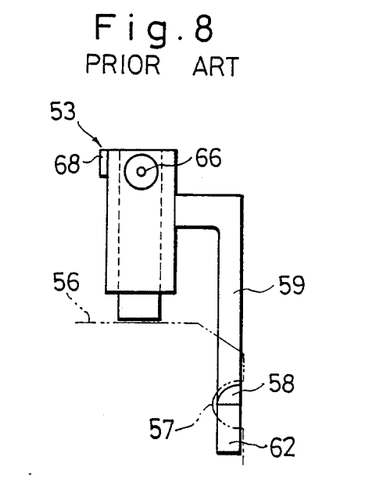
FIG. 8 is a plan view of a slider incorporated into the automatic disk cassette loading mechanism of FIG. 7.

As shown in FIG. 7, this known disk driving apparatus has an automatic loading/ejecting mechanism comprising, as principal components, a swing lever 51 pivotally supported on a shaft 50, a slider 53 capable of reciprocating along a guide shaft 52, and a torsion coil spring 54 having one end, i.e., a lower end as viewed in FIG. 7, connected to the free end of the swing lever 51 and the other end, i.e., an upper end as viewed in FIG. 7, connected to the slider 53. When the swing lever 51 is turned on the shaft 50, the slider 53 is caused to slide along the guide shaft 52 by the torsion coil spring 54. As shown in FIG. 8, the slider 53 has an arm 59 provided with a pin 58 which engages a recess 57 formed in a disk cassette 56 in the lower surface thereof facing a disk driving mechanism. When the disk cassette 56 is inserted in the disk driving apparatus to a predetermined position, the pin 58 of the arm 59 engages the recess 57 of the disk cassette from below as viewed in FIG. 9. After the pin 58 has engaged the recess 57 of the disk cassette, the slider 53 is allowed to slide in a predetermined direction for loading the disk cassette 56.

Figure 9:
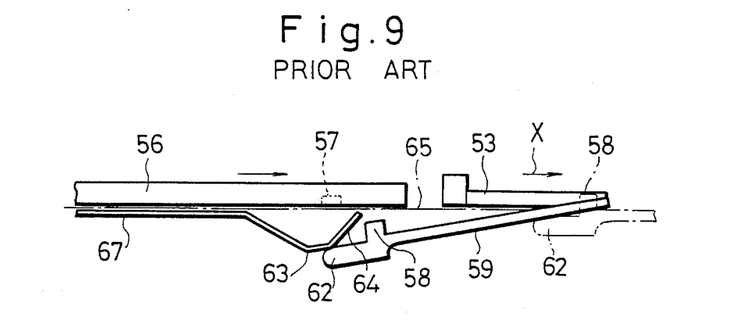
FIG. 9 is a schematic side elevation of assistance in explaining the displacement of the slider of FIG. 8.
Figure 10:
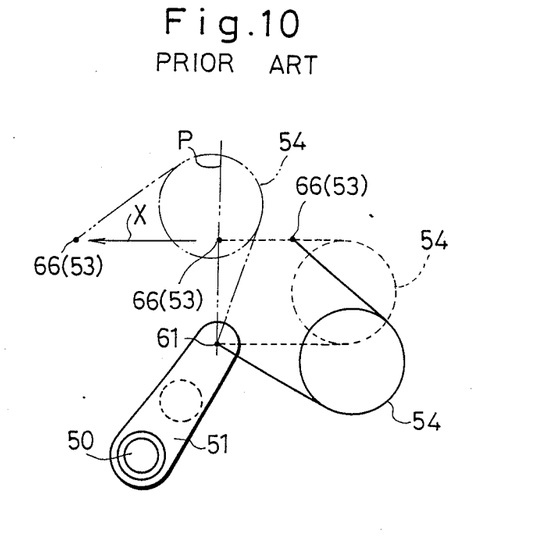
FIG. 10 is a diagrammatic illustration of assistance in explaining the function of the torsion coil spring of FIG. 7.

This disk driving apparatus uses the relation between the resilience and displacement of the torsion coil spring 54 for loading the disk cassette 56. In loading the disk driving apparatus with the disk cassette 56, the torsion coil spring 54 is positioned at a standby position as indicated by solid lines in FIG. 10 and the swing lever 51 is restrained from turning by an ejecting lever 60. When the slider 53 is pressed backward, namely, in the direction of an arrow X (FIGS. 7, 9, 10) by the disk cassette 56, the torsion coil spring 54 caused to turn counterclockwise about a hole 61 formed in the swing lever 51 to receive the lower end of the torsion coil spring 54. As the torsion coil spring 54 is turned in that manner, the distance between the upper and lower ends thereof decreases gradually. The distance is reduced to the smallest value upon the arrival of the torsion coil spring 54 at a position indicated by dotted lines in FIG. 10, where both the upper and lower ends of the torsion coil spring 54 are on a straight line P perpendicular to the direction of the arrow X and the resilience of the torsion coil spring 54 is increased to the maximum. The disk cassette 56 is pushed into the disk driving apparatus by hand or by mechanical means until the torsion coil spring 54 is turned to the position indicated by dotted lines in FIG. 10. Referring to FIGS. 9 and 10, while the slider 53 is moved in the direction of the arrow X turning the torsion coil spring 54 toward the position indicated by dotted lines, the extremity 62 of the arm 59 slides along the inclined surface 64 extending obliquely upward to the right, as viewed in FIG. 9, of the control plate 63 of a cassette holder 67 and, finally, the pin 58 of the arm 59 projects into a disk inserting path 65 to engage the recess 57 of the disk cassette 56, so that the slider 53 and the disk cassette 56 are combined.

As the slider 53 is moved further in the direction of the arrow X further turning the torsion coil spring 54 in a counterclockwise direction, the upper end of the torsion coil spring 54 engaging a hole 66 formed in the slider 53 is moved beyond the straight line P. Upon the passage of the upper end of the torsion coil spring 54 across the straight line P, the torsion coil spring 54 is caused to recoil by the energy stored therein, and hence the upper end of the torsion coil spring 54 moves automatically further in the direction of the arrow X as indicated by alternate long and two short dashes lines in FIG. 10, whereby the disk cassette 56 is pulled automatically into the disk driving apparatus. Slightly before the torsion coil spring 54 arrives at the final position indicated by alternate long and two short dashes lines in FIG. 10, the disk cassette 56 arrives at a position directly above a disk driving mechanism and, at the same time, an unlocking lug 68 fixedly provided at the rear end of the slider 53 strikes against a locking lever, not shown, to disengage a locking mechanism, so that the disk cassette is mounted on the disk driving mechanism.

This disk driving apparatus, however, has drawbacks. That is, since the arm 59 swings below the disk cassette 56 in a vertical plane to bring the pin 58 into engagement with and to disengage the same from the recess 57 of the disk cassette 56, it is difficult to form the disk driving apparatus in a comparatively small height. When the arm 59 is arranged so as to swing laterally in a horizontal plane, the width of the disk driving apparatus will be increased.

SUMMARY OF THE INVENTION

Accordingly, it is an object of the present invention to provide a disk cassette loading mechanism for a disk driving apparatus, formed in a compact construction having an excellent space factor, and capable of surely preventing damages to the components of the disk driving apparatus attributable to erroneous disk cassette loading and unloading operation.

To achieve the object of the invention, the present invention provides a disk cassette loading mechanism comprising a first operating member which engages a recess formed in a disk cassette upon the simultaneous arrival of the disk cassette at a predetermined position on a cassette holder and disengagement of a locking mechanism and remains engaging the recess of the disk cassette until the locking mechanism is engaged again; a second operating member which supports the first operating member, is always urged resiliently in a cassette loading direction by resilient means and moves the disk cassette in the cassette loading direction when the locking mechanism is disengaged; and a third operating member which is brought into engagement with the first operating member in ejecting the disk cassette to move the first operating member in a locking direction opposite the cassette loading direction to a retracted position where the first operating member is locked.

In operation, the first operating member locking the second operating member releases the second operating member and, at the same time, part of the first operating member engages the recess of a disk cassette upon the arrival of the disk cassette at a predetermined position on the cassette holder. Then, the second operating member starts being moved by the resilient means to shift the disk cassette to a predetermined loading position to load the disk cassette automatically. The first operating means remains engaging the disk cassette until the second operating member is locked again. Therefore, once the first operating member engages the disk cassette, the disk cassette can not be pulled out manually until a cassette ejecting operation is completed. During a cassette ejecting operation, the third member returns the first operating member to the locking position and locks the first operating member at the locking position simultaneously with the completion of the cassette ejecting operation, and thereby the second operating member is locked again by the first operating member.

BRIEF DESCRIPTION OF THE DRAWINGS

The above and other objects, features and advantages of the present invention will become fully apparent from the following description taken in conjunction with the accompanying drawings, in which.

DESCRIPTION OF THE PREFERRED EMBODIMENT

Figure 1:
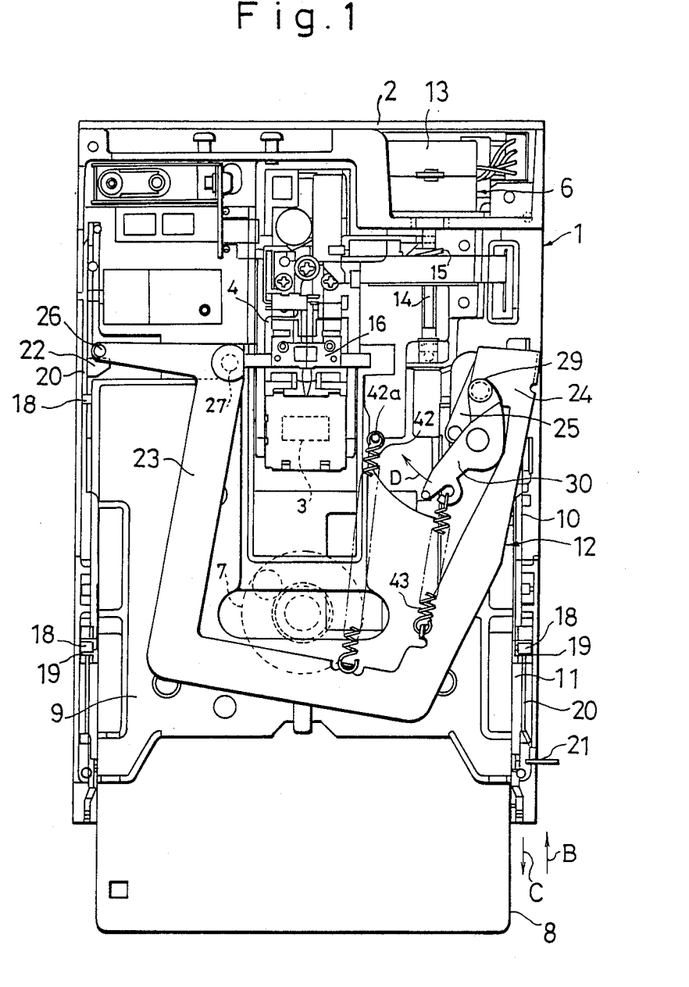
FIG. 1 is a plan view of a disk driving apparatus incorporating a disk cassette loading mechanism, in a preferred embodiment, according to the present invention.

Referring to FIG. 1, a disk driving apparatus 1 comprises a chassis 2, a carriage assembly 4 provided on the chassis 2 and carrying a pair of magnetic head 3 on the front end thereof, a carriage moving unit 6 for moving the carriage assembly 4 radially of a disk 5, a turntable 7 which is rotatively driven by a spindle motor, now shown, provided on the backside of the chassis 2, a cassette holder 9 for holding a disk cassette within the disk driving apparatus 1, a frame 10 supporting the cassette holder 9 for vertical movement relative to the chassis 2, a sliding plate 11 for driving the cassette holder 9 for vertical movement, and a disk cassette loading mechanism 12 which transfers the disk cassette 8 from an ejecting position to a loading position and vice versa.

The chassis 2 is formed of aluminum through a die casting process. The carriage moving unit 6 is disposed at the rear end, namely, the upper end as viewed in FIG. 1, of the disk driving apparatus 1. The turntable 7 is disposed in the front section, namely, the lower section as viewed in FIG. 1, of the disk driving apparatus 1. The sliding plate 11 and the cassette holder 9 are arranged in the vicinity of the turntable 7.

The carriage moving unit 6 comprises a stepping motor 13, and a driving shaft 14 coaxially coupled with the output shaft of the stepping motor 13 and having a helical cam groove formed in the circumference thereof.

The carriage assembly 4 comprises a carriage body, and a holding case 16 hinged to the base end of the carriage body. The pair of magnetic heads 3 are attached respectively to the respective front ends of the carriage body and the holding case 16. The carriage assembly 4 is moved longitudinally of the chassis 2, namely, vertically as viewed in FIG. 1, along a guide shaft, not shown, by the carriage moving unit 6. A cam follower 15 fixed to and projecting from the carriage body engages the helical cam groove of the driving shaft 14 to convert the rotary motion of the driving shaft 14 into the linear motion of the carriage 4.

The cassette holder 9 has an upper wall, opposite side walls perpendicularly extending from the opposite side edges of the upper wall, and flanges perpendicularly extending respectively from the side walls, which are formed integrally by bending a plate substantially in a U-shaped cross section. The disk cassette 8 is held along the side edges thereof on the flanges of the cassette holder 9 so that the hub 17 of the disk 5 can be positioned opposite to the turntable 7. A pair of front rollers 18 are attached rotatably respectively to the outer surfaces of the opposite side walls of the cassette holder 9 in the front portion of the cassette holder 9 so as to roll perpendicularly to the chassis 2 along vertical guide grooves 19 formed in the frame 10. A back roller 18 is attached rotatably to the outer surface of one of the side wall of the cassette holder 9 in the rear portion of the cassette holder 9. The cassette holder 9 is biased resiliently toward the chassis 2 by a coil spring, not shown.

Figure 2:
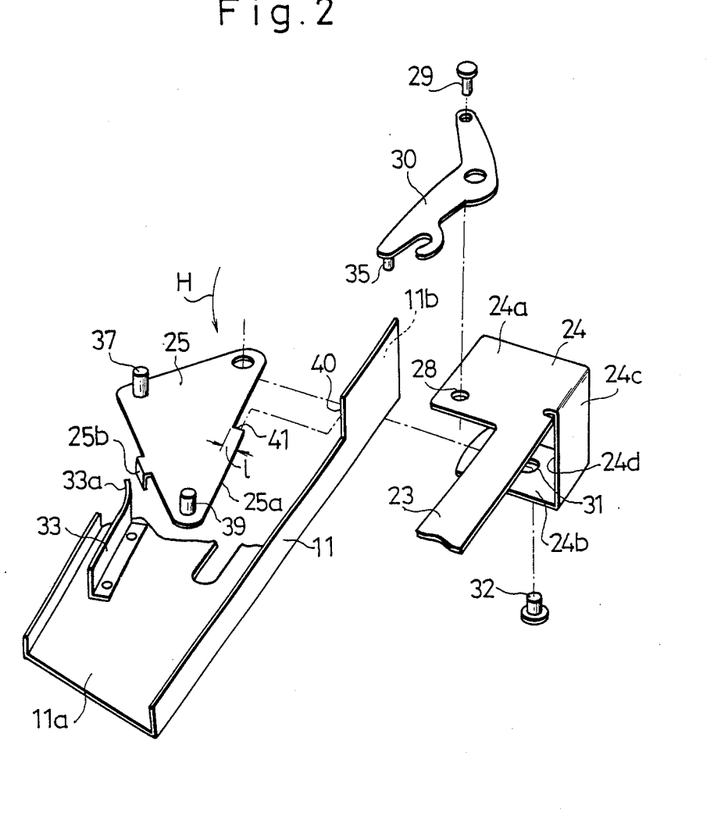
FIG. 2 is an exploded perspective view of the essential portion of the disk cassette loading mechanism of FIG. 1.

The sliding plate 11 is disposed between the chassis 2 and the cassette holder 9 so as to be able to slide longitudinally of the chassis 2. The sliding plate 11 has side walls 20 each provided with a flat surface parallel to the upper surface of the chassis 2, on which the rollers 18 roll in the unloading operation, and an inclined surface declining to the rear of the chassis 2, for guiding the cassette holder 9 downward in the loading operation and for guiding the cassette holder 9 upward in the ejecting operation. A pressing lug 21 which is pressed for the ejecting operation is provided at the front end, as viewed in FIG. 1, of the right-hand side wall 20, as viewed in FIG. 1, and a striking lug 22 for initiating the loading operation is provided at the rear end, as viewed in FIG. 1, of the left-hand side wall 20, as viewed in FIG. 1, of the sliding plate 11. As shown in FIG. 2, a shoulder 40 is formed at the rear of the right-hand side wall 20 of the sliding plate 11 so as to come into contact with a locking shoulder 41 formed in a locking plate 25. A pressing plate (third operating member) 33 is set upright on the bottom wall 11a of the sliding plate 11 so as to come into contact with the locking plate 25 immediately before the completion of the ejecting operation to turn the locking plate in a locking direction. The pressing plate 33 is formed by bending a single spring plate in an L-shape. Part of the upright leg of the pressing plate 33 is bent in a curved surface to form a pressing part 33a which comes into contact with the lug 25b of the locking plate 25. The other leg 33b of the pressing plate 33 is fixed to the bottom wall 11a of the sliding plate 11 so that the upright leg of the pressing plate 33 extends longitudinally.

The disk cassette loading mechanism 12 comprises, as the principal components, a substantially U-shaped lever (second operating member) 23 pivotally supported on the rear upper wall of the cassette holder 9 by a pivot shaft 27, and the locking plate (first operating member) 25 pivotally supported at the right-hand end 24 (FIG. 1) of the lever 23. A pin 26 is attached to the left-hand end of the lever 23 so as to be able to engage the striking lug 22. The lever 23 is able to swing on the pivot shaft 27 along the upper surface of the upper wall of the cassette holder 9. As shown in FIG. 2, the right-hand end 24 of the lever 23 is bent in a U-shape having a side wall 24c extending along the side wall of the cassette holder 9, and a lower wall 24b extending under the bottom wall of the cassette holder 9. A shutter opening lever 30 is supported pivotally on the upper wall 24a of the right-hand end 24 of the lever 23 for swing motion on a pin 29 fixedly fitted in a through hole 28 formed in the upper wall 24a. The locking plate 25 is supported pivotally on the lower wall 24b of the right-hand end 24 of the lever 23 for swing motion along the upper surface of the lower wall 24b on a pin 32 fixedly fitted in a through hole 31 formed in the lower wall 24b.

A pin 35 for operating the shutter 34 of the disk cassette 8 is attached to the free end of the shutter opening lever 30 so as to project from the lower surface of the shutter opening lever 30 toward the chassis 2. An operating pin 37 with which the inner side of the disk cassette 8 comes into contact, and a pin 39 which engages the recess 38 of the disk cassette 8 are fixed upright to the locking plate 25. The locking shoulder 41 which engages the shoulder 40 of the sliding plate 11 is formed in the right-hand side as viewed in FIG. 2 and the lug 25b projects downward from another side of the locking plate 25 so as to be able to engage the pressing part 33a of the pressing plate 33. When the sliding plate 11 is moved backward, the pressing part 33a engages the lug 25b to turn the locking plate 25 counterclockwise as viewed in FIG. 2. An extension coil spring 42 is extended between a pin 42a fixed upright to the cassette holder 9 and the lever 23 to urge the lever 23 resiliently in a counterclockwise direction. An extension coil spring 43 is extended between the lever 23 and the shutter opening lever 30 to urge the shutter opening lever 30 resiliently in a counterclockwise direction. Accordingly, while the locking shoulder 41 of the locking plate 25 is in engagement with the shoulder 40 of the sliding plate 11, the lever 23 is unable to turn in a counterclockwise direction and is locked in an ejecting state.

Figure 3:
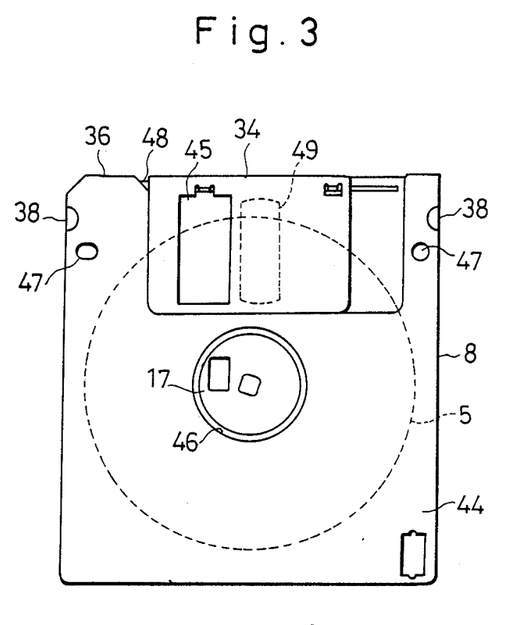
FIG. 3 is a bottom view of a disk cassette.

Referring to FIG. 3, the disk cassette 8 has a case 44 formed of a hard synthetic resin, a flexible magnetic disk 5 contained in the case 44, and a metallic sliding shutter 34 slidably fitted on the rear end (upper end as viewed in FIG. 3) 36 of the case 44 and resiliently biased in a closing direction by a spring, not shown. The case 44 is provided with magnetic head receiving apertures 49. Openings 45 substantially the same in shape as the magnetic head receiving apertures 49 are formed in the shutter 34 at a predetermined position so as to coincide respectively with the magnetic head receiving holes 49 when the shutter 34 is opened to allow the magnetic heads 3 to come into contact with the magnetic disk 5. An opening 46 through which the hub 17 of the magnetic disk 5 is exposed, positioning holes 47 for positioning the disk cassette 8, and the recesses 38 opening sideways are formed in the bottom wall of the case 44.

In loading the disk cassette 8 on the disk driving apparatus 1, the disk cassette 8 is inserted in the cassette holder 9 through an entrance in a position as shown in FIG. 1. Then, one end 48 of the shutter 34 on the rear side 36 of the disk cassette 8 comes into contact with the pin 35 of the shutter opening lever 30. As the disk cassette 8 is inserted further to a position shown in FIG. 4, the shutter opening lever 30 is turned clockwise (in the direction of an arrow D) against the resilient force of the extension coil spring 43 opening the shutter 34, so that the openings 45 of the shutter 34 coincide respectively with the magnetic head receiving apertures 49 of the case 44.

Figure 4:
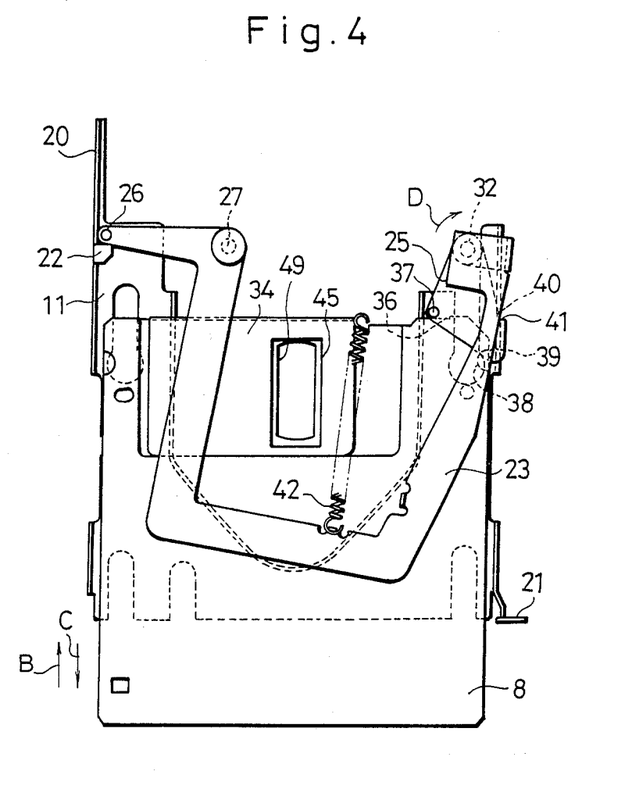
FIGS. 4, 5 and 6 are plan views of assistance in explaining the operation of the disk cassette loading mechanism of FIG. 1, showing different stages of disk cassette loading operation.

In this state, the locking shoulder 41 of the locking plate 25 is in engagement with the shoulder 40 of the frame 10 to lock the locking plate 25 and the lever 23 at the ejecting position. When the disk cassette 8 is inserted to a position where the shutter 34 is fully opened, the rear side 36 of the disk cassette 8 is substantially in contact with the operating pin 37 of the locking plate 25, and the recess 38 is positioned substantially opposite to the pin 39 of the locking plate 25.

Figure 5:
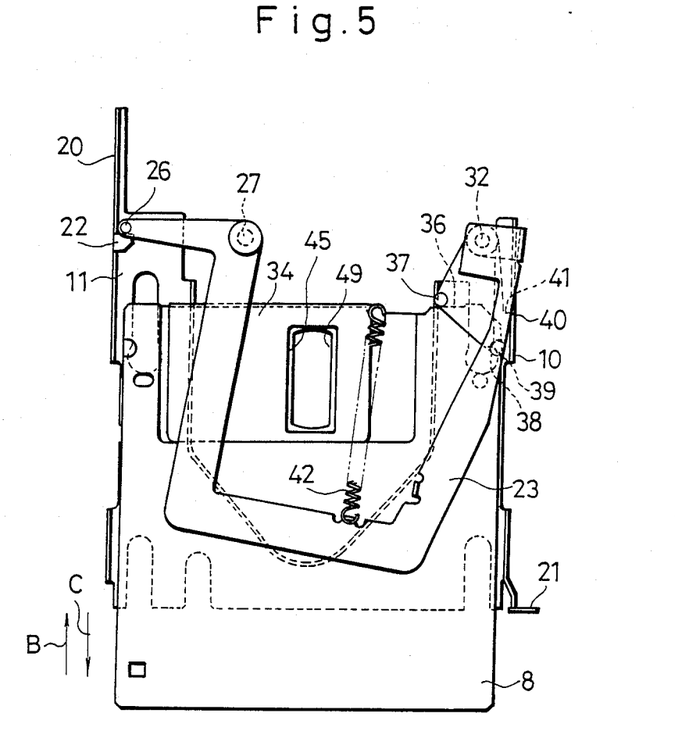

Then, as the disk cassette 8 is pushed further inward from the position shown in FIG. 4, the rear side 36 of the disk cassette 8 pushes the operating pin 37 to turn the locking plate 25 clockwise (in the direction of the arrow D) on the pivot shaft 32. When the locking plate 25 is turned through an angle corresponding to the height l of the locking shoulder 41, the locking shoulder 41 is disengaged from the shoulder 40 of the frame 10. Upon the complete disengagement of the locking shoulder 41 from the shoulder 40, the pin 39 drops into the recess 38 of the disk cassette 8 as shown in FIG. 5, and thereby the disk cassette 8 is caught by the pin 39.

Upon the disengagement of the locking plate 25 from the sliding plate 11, hence, the disengagement of the lever 23 from the sliding plate 11, the lever 23 is turned counterclockwise on the pivot shaft 27 by the extension coil spring 42 to draw in the disk cassette 8 caught by the pin 39 in the direction of the arrow B. While the disk cassette 8 is thus being moved in the direction of the arrow B, the side 25a of the locking plate 25 in which the locking shoulder 41 is formed is in contact with the inner surface 11b of the sliding plate 11 and hence the locking plate 25 is unable to turn clockwise. Therefore, the pin 39 is never disengaged from the recess 38 of the disk cassette 8.

Figure 6:
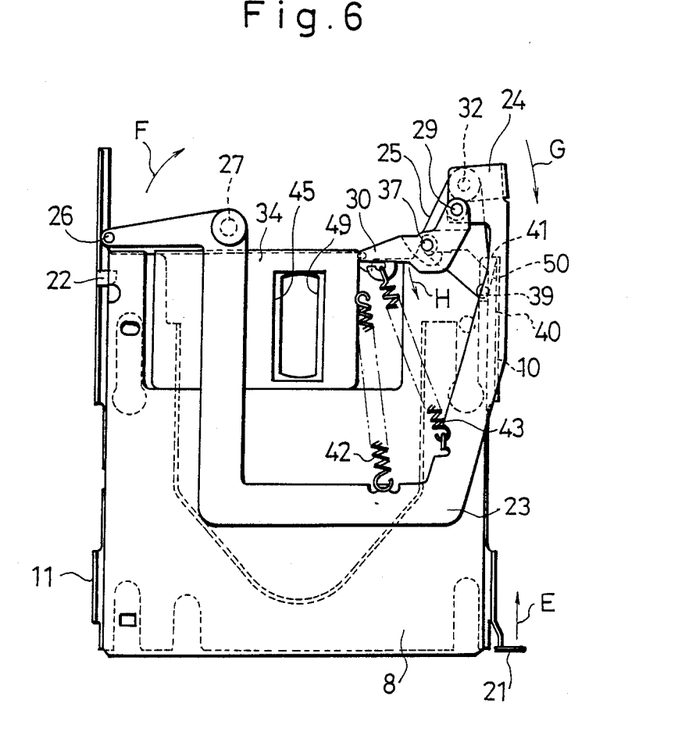

While the lever 23 is being turned counterclockwise to move the disk cassette 8 in the direction of the arrow B, the pin 26 provided at the left-hand end of the lever 23 comes into contact with the striking lug 22 provided on the left-hand side wall 20 of the sliding plate 11 to slide the sliding plate 11 in the direction of an arrow C. The arrival of the hub 17 of the disk 5 of the disk cassette 8 at a position directly above the turntable 7, namely, the arrival of the disk cassette 8 at the loading position, is coincident with the arrival of the inclined surface formed in the side wall 20 of the sliding plate 11 at a position opposite the roller 18 of the cassette holder 9. Accordingly, after the disk cassette 8 has arrived at the loading position, the sliding plate 11 is moved further in the direction of the arrow C by the combined effect of a resilient force biasing the cassette holder 9 toward the chassis 2 and the inclined surface formed in the side wall 20 of the sliding plate 11, while the rollers 18 rolls along the guide grooves 19 so that the cassette holder 9 is lowered vertically to load the disk 5 on the turntable 7 as shown in FIG. 6. Then, the magnetic heads 3 are brought into contact with the disk 5 through the apertures 49 for recording or reproducing operation.

When the sliding plate 11 is pressed at the pressing lug 21 in the direction of an arrow E (FIG. 6) at the completion of the recording or reproducing operation, the roller 18 of the cassette holder 9 is raised by the sliding plate 11 along the inclined surface and the striking lug 22 comes into contact with the operating pin 26. As the sliding plate 11 is pressed further, the striking lug 22 presses the operating pin 26 to turn the lever 23 clockwise (in the direction of an arrow F) on the pivot shaft 27. Consequently, the right-hand end of the lever 23 is moved in the direction of an arrow G to move the disk cassette 8 in the direction of the arrow C. Immediately before the completion of the ejecting operation, the pressing part 33a of the pressing plate 33 comes into contact with the lug 25b of the locking plate 25 to turn the locking plate counterclockwise (in the direction of an arrow H) as the sliding plate 11 is pressed further rearward. Then, upon the engagement of the locking shoulder 41 of the locking plate 25 with the shoulder 40 of the sliding plate 11, the pin 39 is disengaged from the recess 38 of the disk cassette 8 and the disk cassette 8 is ejected in the direction of the arrow C by the resilient force of the extension coil spring 43 resiliently biasing the shutter opening lever 30 in the direction of the arrow H. Since the shutter opening lever 30 is turned in the direction of the arrow H in ejecting the disk cassette 8, the shutter 34 is closed when the disk cassette 8 is ejected. Thus, the shutter opening lever 30 functions also as an ejecting lever, while the lever 23 functions also as means for converting the direction of motion of the sliding plate 11 into the inverse direction of motion of the disk cassette 8. When the locking plate 25 is brought into engagement with the sliding plate 11, the lug 25b of the locking plate 25 is separated from the pressing part 33a of the pressing plate 33. Thus, the disk cassette 8 can be pulled out from the disk driving apparatus by hand only after the completion of the ejecting operation.

Although this embodiment employs the lever 23 pivotally supported on the pivot shaft 27 as the second operating member for converting the direction of motion of the sliding plate 11 into the inverse direction of motion of the disk cassette, a gear mechanism may be used for the same purpose.

Furthermore, this embodiment employs the pressing plate 33 attached to the sliding plate 11 as the third operating member for turning the locking member, i.e., the third operating member, the pressing plate 33 need not necessarily be attached to the sliding plate 11, but may be provided at any suitable position depending on the construction of the disk driving apparatus.

Still further, the shoulder 40 formed in the sliding plate 11 may be formed in any appropriate member of the disk driving apparatus as far as the shoulder 40 is able to engage the locking shoulder 41 to lock the locking plate at a predetermined position.

As apparent from the foregoing description, the present invention has the following advantages.

(1) Since the principal functional parts for loading a disk cassette on the disk driving apparatus are only the lever 23 and the locking plate 25 each being formed in an integral member by bending a plate, the disk cassette loading mechanism can be constructed by a comparatively small number of parts.

(2) Since the lever 23 is disposed and operates in a plane parallel to the upper surface of the cassette holder 9 requiring less space for operation as compared with that required by the corresponding member of the conventional disk cassette loading mechanism, the disk driving apparatus incorporating the disk cassette loading mechanism of the present invention can be constructed in a reduced thickness (height) as compared with the conventional disk driving apparatus.

(3) The disk cassette loading mechanism has a high space factor because the disk cassette loading mechanism does not have any component which projects excessively in the direction of the thickness or width of the disk driving apparatus.

(4) Since the pin 39 of the locking plate 25 is securely received in the recess 38 of the disk cassette 8 while the locking plate 25 is disengaged from the sliding plate 11, the erroneous movement of the disk cassette 8 within the disk driving apparatus can surely be obviated.

(5) Since the idle movement of the locking plate 25 is inhibited by the engagement of the inner surface 11b of the sliding plate with the side 25a of the locking plate 25 after the pin 39 of the locking plate 25 has been received in the recess 38 of the disk cassette 8, the pin 39 of the locking plate 25 is never disengaged from the recess 38 of the disk cassette 8 until the locking plate 25 is locked again to the sliding plate 11.

(6) Since the pin 39 of the locking plate 25 is securely in engagement with the recess 38 of the disk cassette 8 while the locking plate 25 is released from the sliding plate 11, it is impossible to pull out the disk cassette accidentally from the disk driving apparatus.

(7) Since the disk cassette 8 cannot be pulled out from the disk driving apparatus before the disk cassette 8 is ejected automatically, damages to the internal mechanism of the disk driving apparatus and malfunction of the disk driving apparatus attributable to the accidental removal of the disk cassette 8 can be prevented.

Although the invention has been described in its preferred form with a certain degree of particularity, obviously many changes and variations are possible therein. It is therefore to be understood that the present invention may be practiced otherwise than specifically described herein without departing from the scope and spirit thereof.

What is claimed is:

1. A disk cassette loading mechanism for a disk driving apparatus 1 having a chassis 2, a cassette holder 9 for holding a disk cassette 8, a turntable 7 for rotating a disk contained in a disk cassette, a frame 10 for supporting the cassette holder so that the cassette holder is able to move perpendicularly to the chassis, and a sliding plate 11 for moving the cassette holder perpendicularly to the chassis, said disk cassette loading mechanism comprising:

a first operating member 25 pivotally coupled to a first arm 24 of a second operating member 23 and movable in a plane horizontal to a plane of said cassette holder, said first operating member having a first pin means 37 for being contacted by a disk cassette inserted in the disk driving apparatus upon the arrival of the disk cassette at a predetermined position on the cassette holder, said disk cassette, when contacting said first pin means upon insertion of said disk cassette, applying pressure thereto to cause said first operating member to pivot in a first pivoting direction about a first pivot point 32, said first operating member having a second pin means 39 which, upon pivoting of said first operating member, engages a recess 38 of the disk cassette, said pivoting of said first operating member causing said first operating member to be unlocked from a first position;

said second operating member 23 which supports the first operating member pivotally thereon being supported pivotally on the chassis at a second pivot point 27, said second operating member being biased resiliently in a cassette loading direction by resilient means 42, said second operating member pivoting about said second pivot point in the cassette loading direction when the first operating member is unlocked during insertion of said disk cassette, said pivoting of said second operating member causing a second arm 26 of said second operating member to exert a force on said sliding plate 11 and causing said sliding plate to be moved in a direction opposite said cassette loading direction, said disk cassette being moved in said cassette loading direction by said second operating member under force supplied by said resilient means for positioning over said turntable, said second operating member being movable in a plane horizontal to a plane of said cassette holder; and a third operating member 33 provided on the sliding plate for engagement with the first operating means when the sliding plate is pushed in said cassette loading direction for cassette ejection operation, said pushing in of said sliding plate in said cassette loading direction for cassette ejection operation, said pushing in of said sliding plate in said cassette loading direction causing said first operating member to pivot in a direction opposite to said first pivoting direction so as to cause the first operating member to be locked 41 and to disengage said first pin 39 from the recess of the disk cassette so that the disk cassette can be removed from the disk driving apparatus, said third operating member and said sliding plate being movable in a plane horizontal to said plane of said cassette holder.

2. A disk cassette loading mechanism according to claim 1, wherein said first operating member is disengaged from the recess of the disk cassette to release the disk cassette free immediately after the disk cassette has arrived at a cassette ejecting position where the disk cassette is ready to be ejected from the disk driving apparatus without interfering with any mechanism of the disk driving apparatus, in ejecting the disk cassette from the disk driving apparatus.

3. A disk cassette loading mechanism according to claim 1 further comprising a fourth operating member 30 for opening the shutter 34 of the disk cassette, said fourth operating member being pivotally supported on said second operating member so as to engage the shutter of the disk cassette to open the shutter when the disk cassette is inserted into the disk driving apparatus.

* * * * *

UNITED STATES PATENT AND TRADEMARK OFFICE
CERTIFICATE OF CORRECTION

PATENT NO. : 4,901,174
DATED : February 13, 1990
INVENTOR(S) : Yukio Saito and Masao Ohkita It is certified that error appears in the above-identified patent and that said Letters Patent is hereby corrected as shown below:

```
Col. 10 line 17-19 - Claim 1 delete "in said cassette... said sliding plate"
```

Signed and Sealed this

Twenty-sixth Day of February, 1991

Attest:

HARRY F. MANBECK, JR.

*Attesting Officer*     *Commissioner of Patents and Trademarks*